(12) United States Patent
Ogawa

(10) Patent No.: US 12,146,364 B2
(45) Date of Patent: Nov. 19, 2024

(54) DOCUMENT COVER CLOSER AND OFFICE EQUIPMENT HAVING THE SAME

(71) Applicant: KEM HONGKONG LIMITED, Kowloon (HK)

(72) Inventor: Satoshi Ogawa, Kanagawa (JP)

(73) Assignee: KEM HONGKONG LIMITED, Tsimshatsui (HK)

( * ) Notice: Subject to any disclaimer, the term of this patent is extended or adjusted under 35 U.S.C. 154(b) by 185 days.

(21) Appl. No.: 17/939,661

(22) Filed: Sep. 7, 2022

(65) Prior Publication Data

US 2023/0079992 A1 Mar. 16, 2023

(30) Foreign Application Priority Data

Sep. 16, 2021 (JP) ................. 2021-151510

(51) Int. Cl.
| | |
|---|---|
| G03G 15/00 | (2006.01) |
| E05F 1/12 | (2006.01) |
| E05F 3/18 | (2006.01) |
| E05F 3/20 | (2006.01) |
| F16C 11/04 | (2006.01) |
| G03G 21/16 | (2006.01) |

(52) U.S. Cl.
CPC ............. *E05F 3/20* (2013.01); *E05F 3/18* (2013.01); *F16C 11/04* (2013.01); *G03G 21/1628* (2013.01); *E05Y 2999/00* (2024.05)

(58) Field of Classification Search
None
See application file for complete search history.

(56) References Cited

U.S. PATENT DOCUMENTS

| | | | |
|---|---|---|---|
| 2014/0201946 A1* | 7/2014 | Yabukoshi | ............ E05F 1/1261 16/304 |
| 2018/0196385 A1* | 7/2018 | Kondo | .................. E05F 1/1253 |

FOREIGN PATENT DOCUMENTS

JP H11-95339 A 4/1999

* cited by examiner

*Primary Examiner* — Leslie J Evanisko
(74) *Attorney, Agent, or Firm* — Notaro, Michalos & Zaccaria P.C.

(57) ABSTRACT

A document cover closer provided with a fire spread preventing cover capable of almost entirely covering internal features of the document cover closer, in order to prevent exposure of the internal features to flare in case of an ignition at peripheral electrical equipment, as well as office equipment using such a document cover closer. The document cover closer comprises a fire spread preventing cover capable of almost entirely covering internal features with their parts coated with oil being exposed and of almost securely preventing a contamination of an end of a document placed on a document platen by lubricant oil or rust-preventive oil. The document cover closer comprises an attaching part attached to the main body side of office equipment having a document cover; a supporting part rotatably and pivotally supported on the attaching part via a first hinge shaft; and a lift part attached to the document cover.

6 Claims, 15 Drawing Sheets

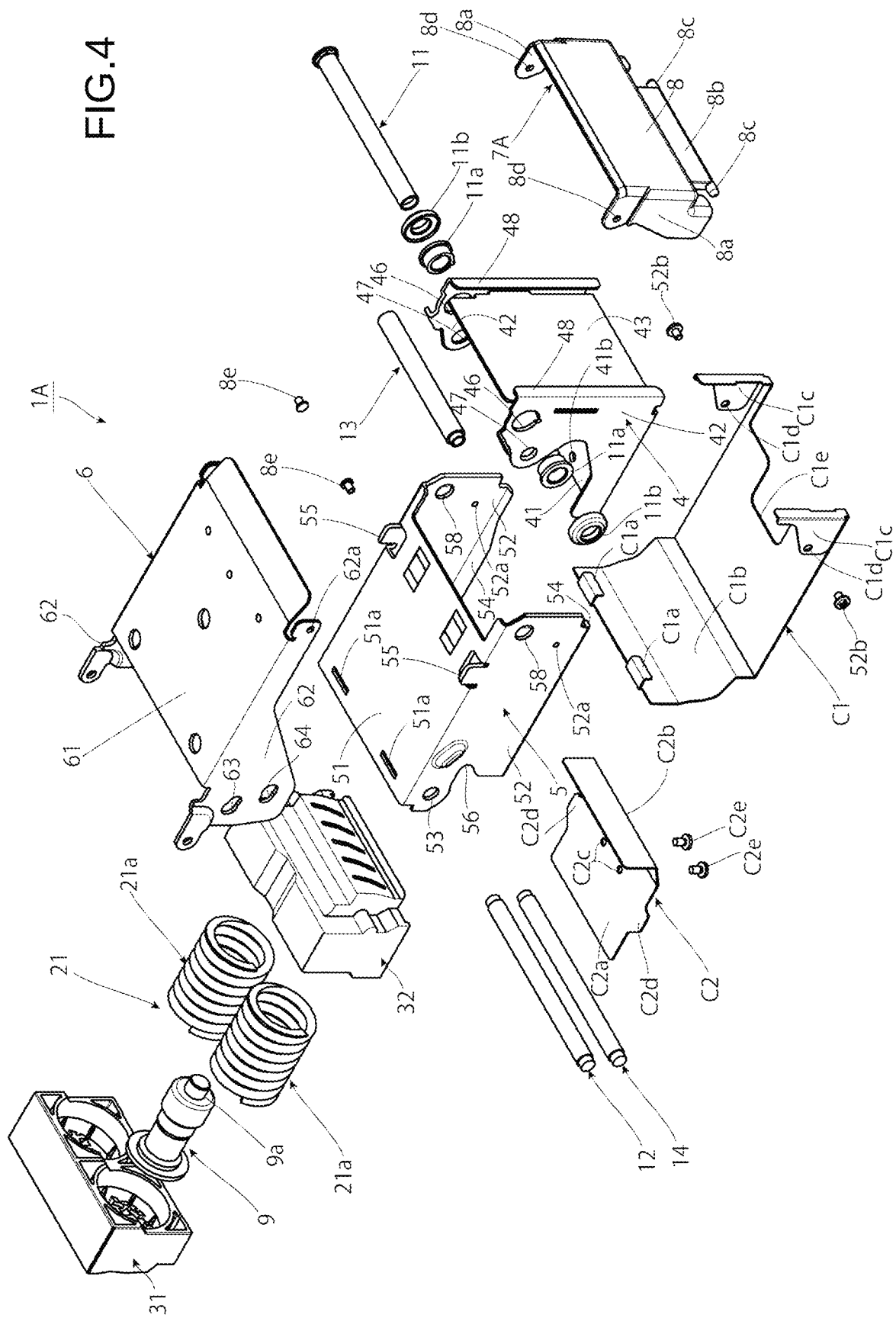

DOCUMENT COVER CLOSER AND OFFICE EQUIPMENT HAVING THE SAME

FIELD OF THE INVENTION

The invention relates to a document cover closer arranged in office equipment such as copying machine, multifunction printer, printer, facsimile and scanner, as well as to office equipment having the document cover closer.

BACKGROUND ART

In some cases, a document covering a document placing surface provided on an upper surface of a main body of office equipment, such as a copying machine, printer, facsimile and scanner, is openably and closably attached via an opening and closing apparatus to the main body. This opening and closing apparatus, referred to as a document cover closer, is configured to ensure that it can bring a document into a pressurized contact with the document placing surface, to allow no external light into the main body and not to hinder a normal copying.

Among such document cover closers, there is known the one provided with a fire spread preventing cover not to contaminate an end of a document placed on a document platen by a lubricant oil such as grease applied on a pressurized member provided on an attaching member side, and in particular the one disclosed in JP Laid-Open Patent Application No. H11-95339. However, it does not sufficiently cover internal features (a slider, an elastic member, a pressurized member and an actuating member, etc.) of the document cover closer, so that in case of an ignition at peripheral electrical equipment of the document cover closer, a problem arises that the internal features are exposed to flare to cause a fire spread.

SUMMARY OF THE INVENTION

The present invention is intended to solve a problem with a conventional art as described above, and has an object to provide a document cover closer which includes fire spread preventing covers capable of almost entirely covering internal features of a document cover closer to prevent an exposure of the internal features to flare in case of an ignition at peripheral electrical equipment, as well as office equipment using such a document cover closer. Additionally, it has an object to provide a document cover closer which comprises fire spread preventing covers capable of almost entirely covering internal features with their parts coated with oil being exposed and of almost securely preventing a contamination of an end of a document placed on a document platen by lubricant oil or rust-preventive oil.

To meet an object as mentioned above, a document cover closer according to the instant disclosure comprises an attaching member attached to the main body side of office equipment having a document cover; a supporting member rotatably and pivotally supported on the attaching member via a first hinge shaft; a lift member attached to the document cover, wherein it overlaps the supporting member and is pivotally supported on the supporting member via a second hinge shaft to be rotatable in a direction contrary to that of the supporting member, a cam slider provided in contact with a pressurized member attached to the attaching member as well as an actuating slider provided in contact with an actuating member provided on the lift member, and an elastic member resiliently provided between the cam slider and the actuating slider, and is characterized in that the following are provided: a first fire spread preventing cover, wherein its one end portion is attached to the supporting member and its other end portion attached to the other end portion of the supporting member to cover front surface sides of the second hinge shaft, the actuating member and the supporting member and a second fire spread preventing cover attached to the cam slider to wrap around and thus cover the pressurized member.

To meet an object as mentioned above, a document cover closer according to the instant disclosure is characterized in that locking pieces provided on one end portion side of a first fire spread preventing cover are inserted into locking holes provided on a back plate of a supporting member and locked in them, while its other end portion side is fixed to both side plates of the supporting member.

To meet an object as mentioned above, a document cover closer according to the instant disclosure is characterized in that one end portion side of a second fire spread preventing cover is fixed to a cam slider, while its other end portion side is bent and configured to have a length enough to ensure that it can cover a pressurized member even when a document cover attached to a lift member is opened.

To meet an object as mentioned above, a document cover closer according to the instant disclosure is characterized in that a concave portion to which a second fire spread preventing cover is attached is provided on a cam slider.

To meet an object as mentioned above, a document cover closer according to the instant disclosure is characterized in that a concave portion for setting free a part of a second fire spread preventing cover is provided on a first fire spread preventing cover.

Then the invention according to the instant disclosure is characterized in that office equipment uses a document cover closer according to one of aspects as mentioned above.

Since the invention is constructed as described in the foregoing, a first fire spread preventing cover and a second fire spread preventing cover can almost entirely cover a front side with internal features being exposed, so that the internal features are sheltered from flare even in case of an ignition at peripheral electrical parts, to prevent a fire spread as far as possible. Still further, a first fire spread preventing cover and a second fire spread preventing cover can almost entirely cover a front surface of a document cover closer coated with lubricant oil or rust-preventive oil so that it can almost securely prevent a contamination of an end of a document placed on a document platen by lubricant oil or rust-preventive oil. Still further, the invention can also prevent floating matters floating in air such as dust from adhering to the inside of a document cover closer.

BRIEF DESCRIPTION OF THE DRAWINGS

FIG. 4 shows an exploded perspective view of a document cover closer according to the invention;

EMBODIMENT

In the following, reference is made to a document cover closer according to the invention, as well as to office equipment using the document cover closer, based on the attached drawings.

FIG. 1 to FIG. 15 show a perspective view illustrating a suitable embodiment of a document cover closer of according to the invention and an example of office equipment using the document cover closer. According to the drawings, the document cover closers 1A, 1B of the invention, though they have different sizes, equally belong to a category of hinge device which rotatably attaches a document cover 3 to an upper surface of a main body 2B of office equipment such as copying machine, printer, facsimile and scanner.

Figure 1:
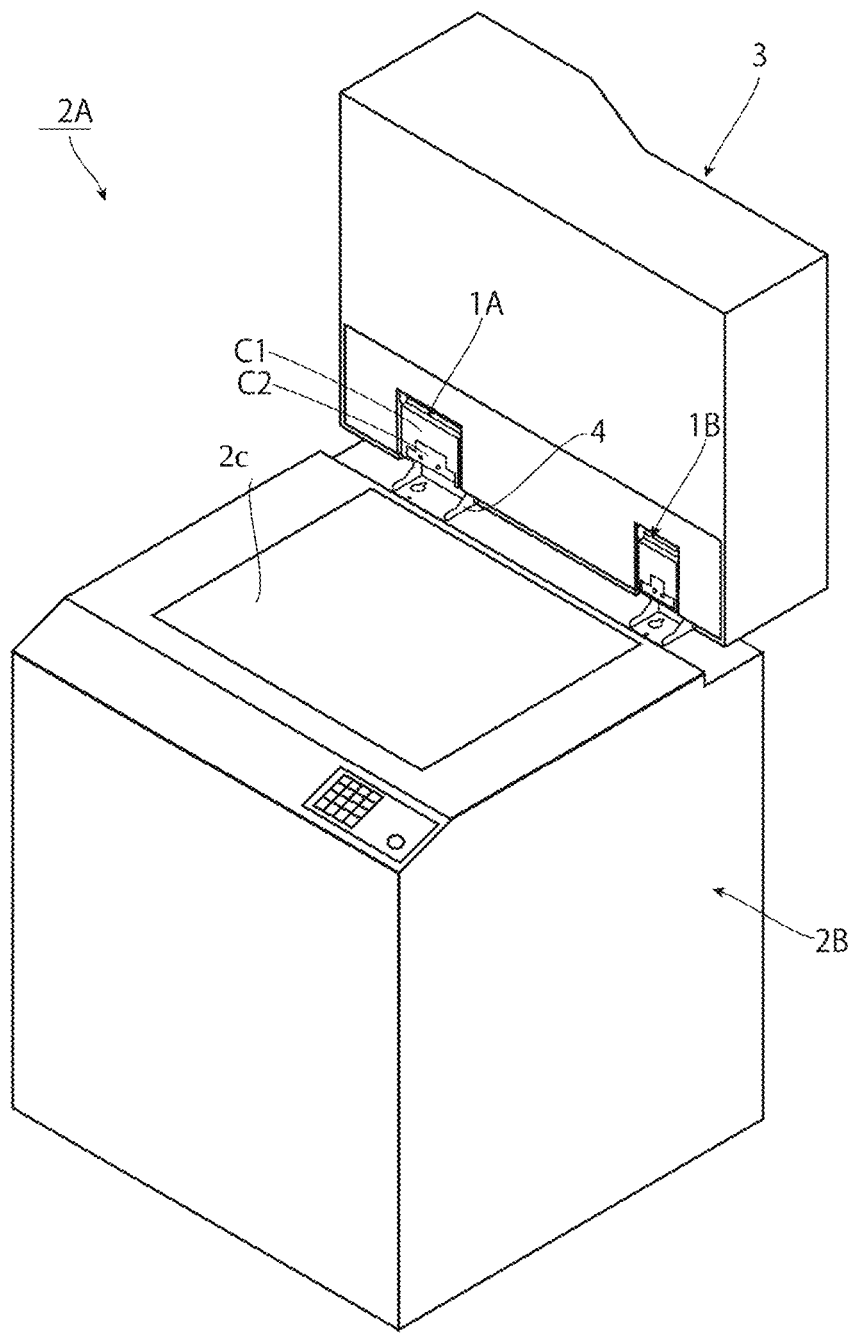
FIG. 1 shows a perspective view illustrating office equipment, typically a copying machine equipped with a document cover closer according to the invention as seen obliquely from the front side.
Figure 2:
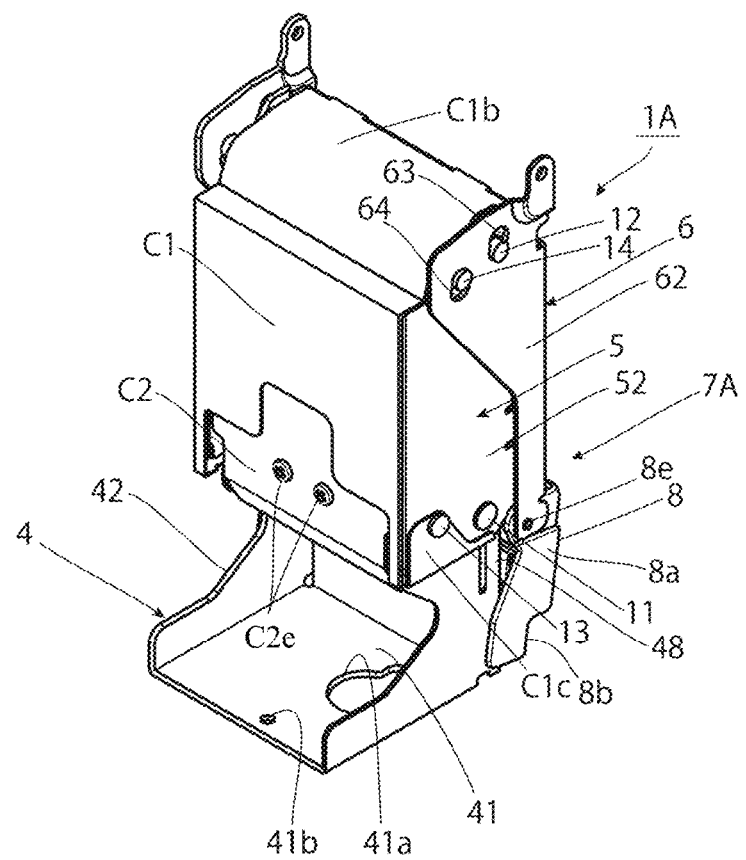
FIG. 2 shows a perspective view illustrating a document cover closer according to the invention as seen obliquely from the front side.
Figure 3:
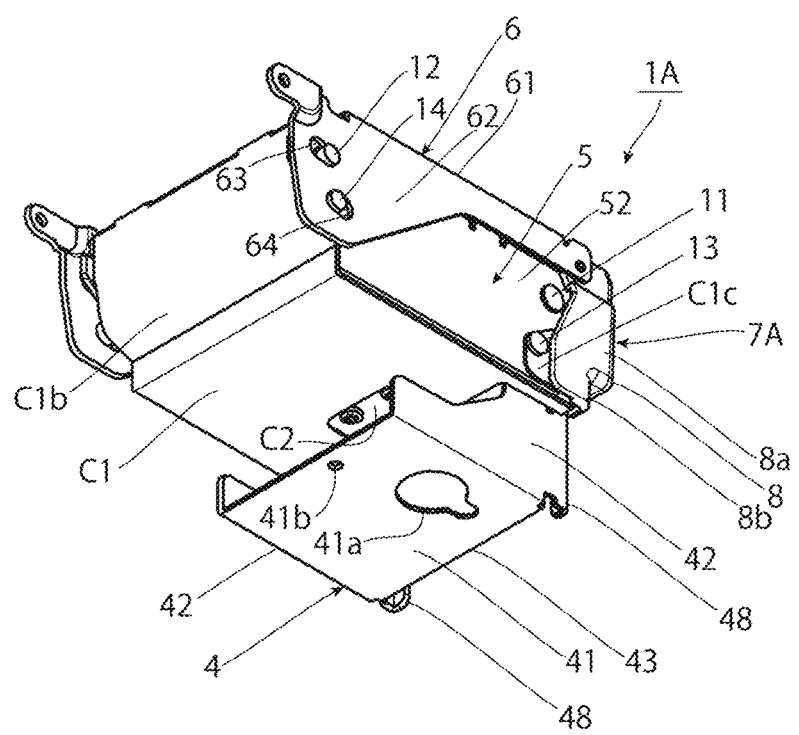
FIG. 3 shows a perspective view illustrating a document cover closer according to the invention as seen obliquely from below.
Figure 5A:
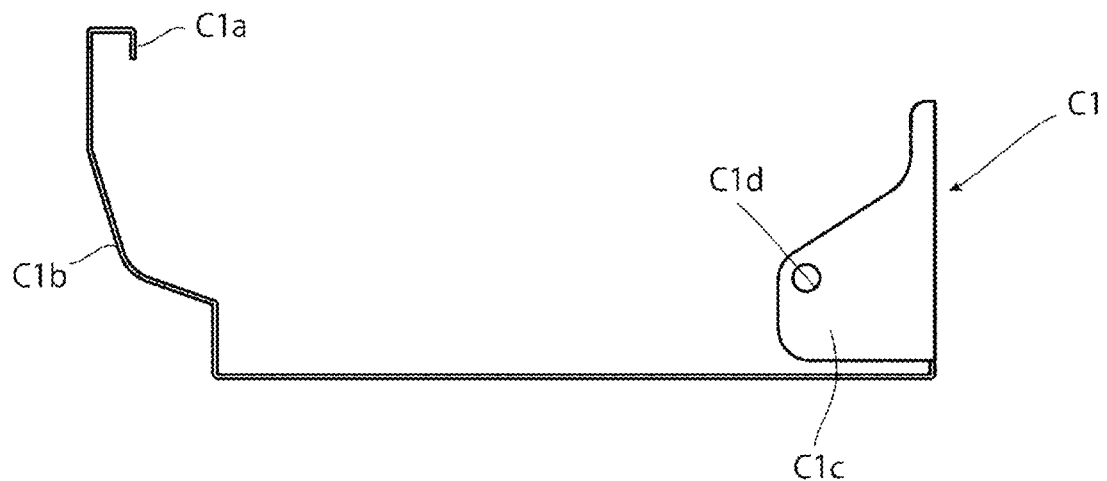
FIGS. 5A and 5B show a first fire spread preventing cover of a document cover closer according to the invention, FIG. 5A being its elevation view, and FIG. 5B—its bottom view.
Figure 5B:
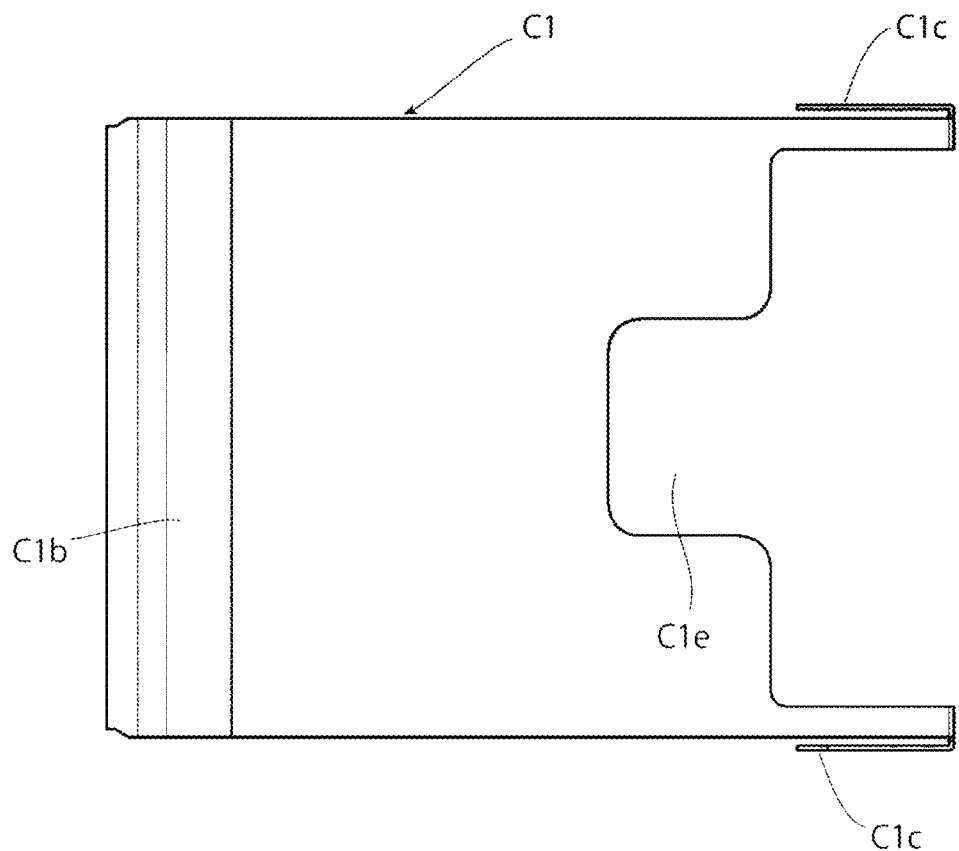
Figure 6:
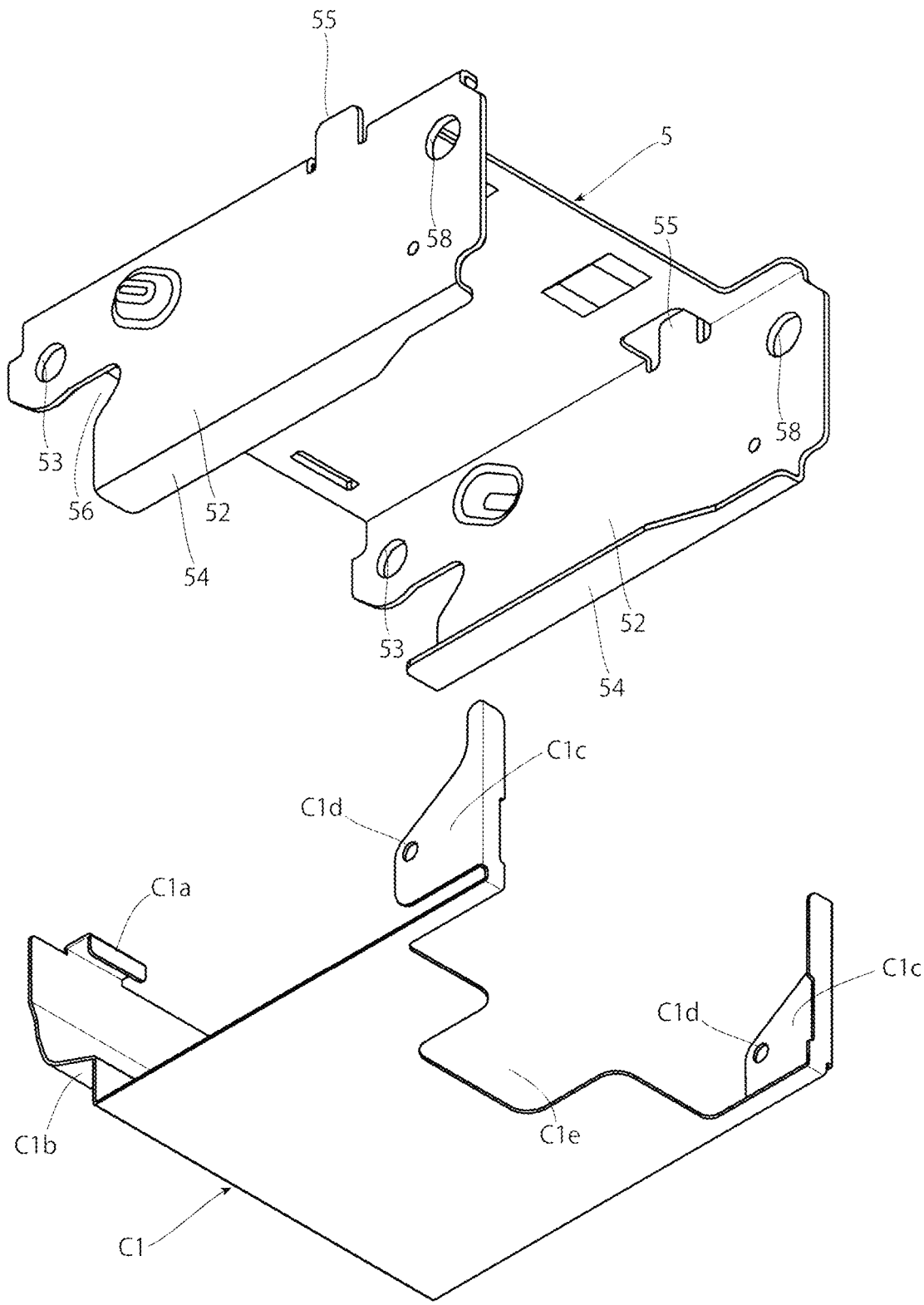
FIG. 6 shows an exploded perspective view of a first fire spread preventing cover and a supporting member of a document cover closer according to the invention.
Figure 7A:
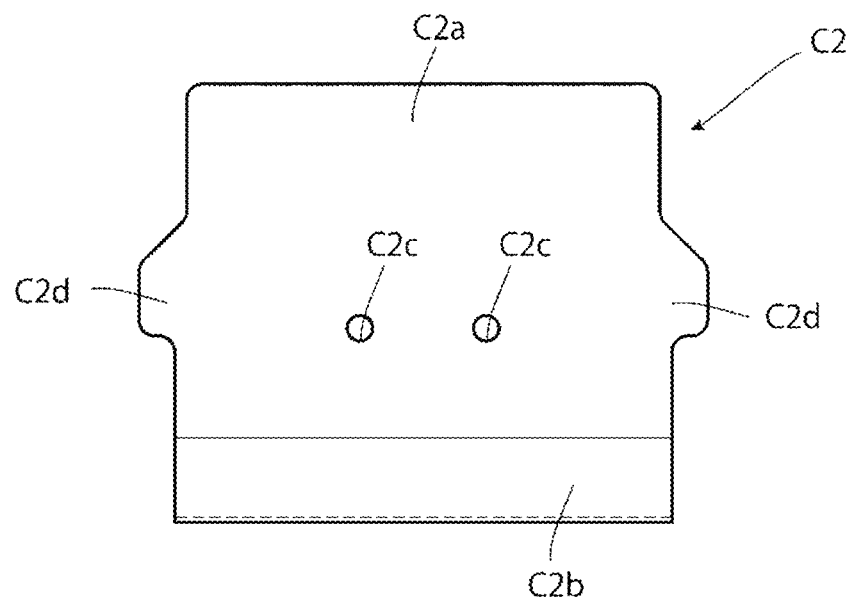
FIGS. 7A and 7B show a second fire spread preventing cover of a document cover closer according to the invention, FIG. 7A being its bottom view, and FIG. 7B—its elevation view.
Figure 7B:
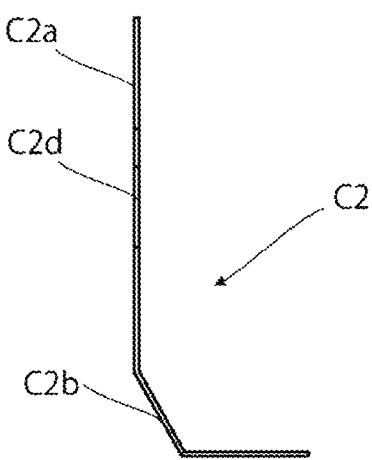

As shown in FIG. 1, document cover closers according to the invention consist of a larger one 1A on the right side and a smaller one 1B on the left side of FIG. 1, wherein the document cover closer 1A on the right side uses double coil springs or oil dampers, while the document cover closer 1B on the left side—only a single coil spring or with no coil spring. Or in some cases an oil damper is used for a single coil spring. This is because an automatic document feeder is provided on one side portion of a document cover 3, so that a load is unevenly applied to the document cover closer 1A on the right side in the drawing. As shown in FIG. 1, a first fire spread preventing cover C1 and a second fire spread preventing cover C2 are attached to both, so these have an identical structure though their sizes are different. In the following, a document cover closer 1A is described further in detail. However, document cover closers 1A, 1B on the right and the left may also have the same size and the same structure, though both are shown in different sizes in Embodiment.

A document cover closer 1A according to the invention comprises an attaching member 4 attached to a main body 2B of a copying machine 2A; a supporting member 2 rotatably coupled via a first hinge shaft 11 to both side plates 42, 42 of the attaching member 4; a lift member 6 for attaching a document cover 3, wherein it is rotatably coupled via a second hinge shaft 12 to the both side plates 52, 52 of the supporting member 5; it further comprises a cam slider 32 in contact with a pressurized member 13 provided on the attaching member 4 and an actuating slider 31 provided in contact with an actuating member 14 provided on the lift member 6, and an elastic member 21 consisting of compression coil springs resiliently provided between the cam slider 32 and the actuating slider 31; a first fire spread preventing cover C1 and a second fire spread preventing cover C2 are installed on the front surface side of the document cover closer 1A, as shown in FIG. 2 and FIG. 12 to FIG. 15. Furthermore, a finger pinching preventing cover 7A is provided between respective rear end sides of a supporting member 6 and a lift member 5. It is noted that the first hinge shaft 11 and the second hinge shaft 12 are shown in the drawings as being respectively single pieces, but it is also acceptable that each of these is divided into two and each of both side plates 42, 42 of the attaching member 4 is separately pivotally attached to matching one of the both side plates 52, 52 of the supporting member 5, and also each of the both side plates 52, 52 of the supporting member 5 to one of both side plates 62, 62 of a lift member 6. The first hinge shaft 11 and the second hinge shaft 12 in the present invention also include the latter. It is noted that reference numerals 11a, 11a denote bearing members, and 11b, 11b—washers, particularly in FIG. 4.

Figure 10A:
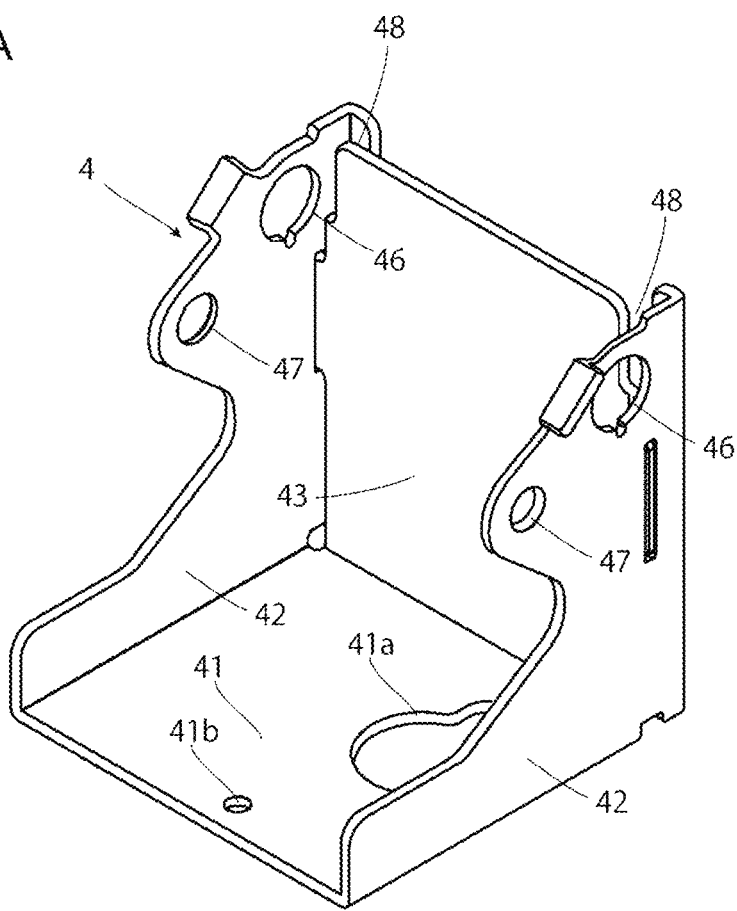
FIGS. 10A and 10B show an attaching member of a document cover closer according to the invention, FIG. 10A being its perspective view, and FIG. 10B—its side view.
Figure 10B:
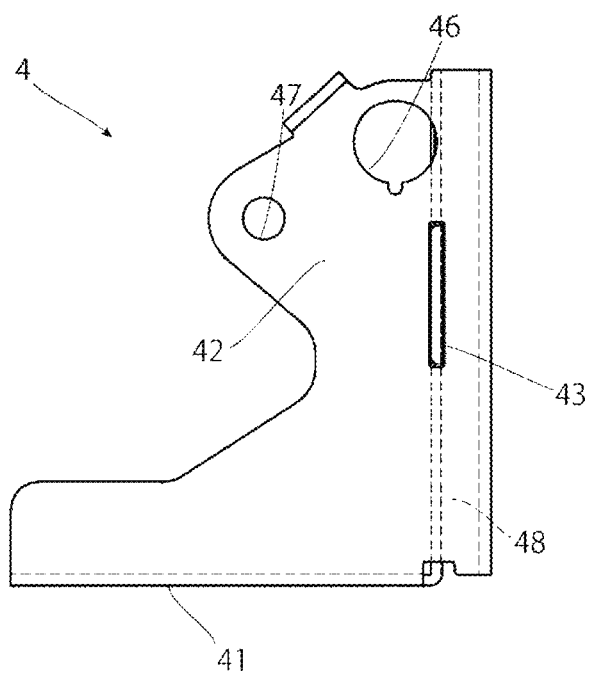

As shown in FIG. 4 and FIG. 10, an attaching member 4 is composed of a bottom plate 41 attached to an upper end side on a rear portion of a main body 2B; both side plates 42, 42 extending from both side end portions of the bottom plate 41 in a direction perpendicular (also substantially perpendicular) to the bottom plate 41; and a rear plate 43 extending from one end portion (rear end portion) of the bottom plate 41 in a direction perpendicular (also substantially perpendicular) to the bottom plate 41.

A bottom plate 41 is formed substantially in the rectangular shape, and a large and a small attaching holes 41a, 41b for attaching it to a main body 2B with attaching bolts T, etc. are provided on it. First hinge shaft holes 46, 46 formed substantially in the L shape are provided on both side plates 42, 42 and at positions at which the plates extend upward perpendicular to the bottom plate 41. Pressurized member holes 47, 47 are provided at positions closer to the bottom plate 41 (below) than the first hinge shaft holes 46, 46 on the both side plates 42 and inclined toward an inside (forward). A pressurized member 13 is inserted into the pressurized member holes 47, 47 provided on the both side plates 42, 42. It is noted that the pressurized member 13 does not need to have a pin-like shape, but may be a curved piece or made of resin and attached to a space between the both side plates 42, 42.

Still further, rail portions 48, 48 for a finger pinching preventing cover 7A to be described below are formed on an attaching member 4 by extending rearward both side plates 42, 42 along both sides of a rear plate 43 and folding their respective tip portions in parallel with keeping intervals with the rear plate 43.

A supporting member 5 is composed of a top plate 51, both side plates 52, 52 extending from both side end portions along a direction in which a pair of an actuating slider 31 and a cam slider 32 (both sliders being a pair) to be described below in a direction perpendicular (also substantially perpendicular) to the top plate 51, and holding pieces 54, 54 formed by folding 90 degrees tip portions of the both side plates 52, 52 respectively toward the opposite side. Still further, stopper pieces 55, 55 are provided upward from the both side plates 52, 52.

Second hinge shaft holes 53, 53 (one only is shown) into which a second hinge shaft 12 is inserted are provided on one end portions (front end portions) of both side plates 52, 52, as well as notch portions 56, 56 (one only is shown) into which an actuating member 14 enters. First hinge shaft holes 58, 58 are provided on other end portions (rear end portions) of the both side plates 52, 52. Respective axes of the first hinge shaft holes 58, 58 of the both side plates 52, 52 and first hinge shaft holes 46, 46 of an attaching member 4 are aligned and then a first hinge shaft 11 is inserted into these holes, so that the supporting member 5 is rotatably coupled to the attaching member 4 about the first hinge shaft 11 being an axis.

An actuating slider 31 and a cam slider 32 are held by holding pieces 54, 54 folded from both side plates 52, 52 of a supporting member 5 and housed in the supporting member 5. The actuating slider 31 and the cam slider 32 respectively comprise closure surfaces 31a, 32a being bottom surfaces, and is formed in the shape of bottomed cylindrical body having a rectangular cross section. The actuating slider 31 and the cam slider 32 are respectively slidably housed in the supporting member 5 to ensure that their respective openings face each other, and an elastic member 21 consisting of compression coil springs 21a, 21a is resiliently provided in the actuating slider 31 and the cam slider 32 being a pair. In other words, concave interiors of the actuating slider 31 and the cam slider 32 are formed as spring housing portions 31b, 32b for housing the compression coil springs 21a, 21a. One or two or more compression coil spring(s) 21a, 21a may be provided, and for example two of them are arranged in parallel or to overlap each other. They are intended to urge the actuating slider 31 and the cam slider 32 being a pair in a direction in which they are spaced apart. Furthermore, an oil damper 9 is housed in one of the compression coil springs 21a, 21a, and installed between the actuating slider 31 and the cam slider 32. As shown in FIG. 12 to FIG. 15, a piston 9a of the oil damper 9 abuts against an inner bottom portion of the slider 32 when a document cover 3 is closed from its opened state to a predetermined closing angle, to prevent a sudden closing and realize a buffering effect.

An actuating slider 31 and a cam slider 32 being a pair are formed in a length to ensure that a document cover 3 is housed in a supporting member 5 when a bottom plate 41 of an attaching member 4 is substantially in parallel to a top plate 51 of a supporting member 5 (when a document cover 3 is in close contact with a surface of a contact glass 2c on an upper surface of a main body 2B for example in case that a document cover closer 1A according to the invention is attached to a copying machine 2A).

An outer surface of a closure surface 31a being a bottom surface of an actuating slider 31 on the tip side is formed into a flat surface. The closure surface 31a presses an actuating member 14 by an urging force of an elastic member 21 to ensure that a supporting member 5 and a lift member 6 overlap each other. In this case, the invention is configured to ensure that a position at which the lift member 6 is coupled to the supporting member 5 using a second hinge shaft 12 is shifted upward as compared to the conventional arrangement, and that a lower surface side of a top plate 61 of a lift member 6 abuts against stopper pieces 55, 55 provided to project upward from both side plates 52, 52 of a supporting member 5; thus it is configured to ensure that a gap is generated between a top plate 51 of the supporting member 5 and the top plate 61 of the lift member 6 to avoid an inclination of the lift member 6 relative to the supporting member 5.

Figure 8:
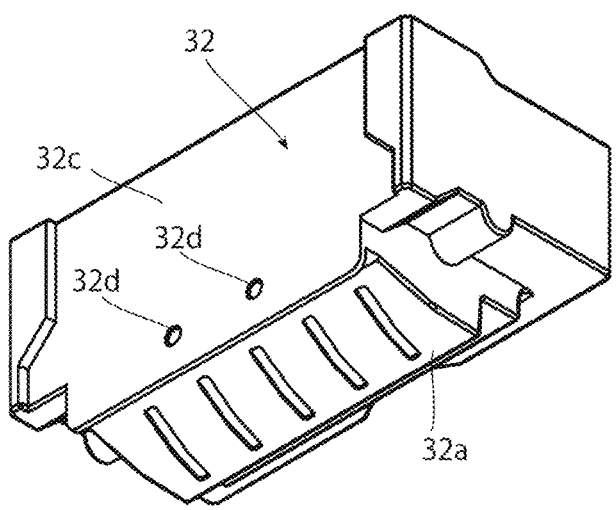
FIG. 8 shows a perspective view of a cam slider of a document cover closer according to the invention.

Furthermore, especially as shown in FIG. 8, a concave portion 32c for attaching a second fire spread preventing cover C2 is provided, and attaching holes 32d, 32d are provided on the concave portion 32c. When structured in this manner, the second fire spread preventing cover C2 does not protrude toward a lower surface side of the cam slider 32, so that it is free from care of falling on a first fire spread preventing cover C1 during its slide.

A lift member 6 is composed of a top plate 61 attached to a rear end side on a rear portion of a document cover 3 and having attaching holes 61a, 61a, 61a; and both side plates 62, 62 extending from both side end portions of the top plate 61 in a direction perpendicular (also substantially perpendicular) to the top plate 61. Second hinge shaft insertion holes 63, 63 (one only is shown) are provided on tip sides of the both side plates 62, 62 of the lift member 6, and actuating member holes 64, 64 into which an actuating member 14 is inserted are provided below the second hinge shaft insertion holes 63, 63. A pressurized member 14 is inserted into the pressurized member holes 64, 64 of the both side plates 62, 62 and fixed to them. Respective axes of the second hinge shaft insertion holes 63, 63 of the both side plates 62, 62 of the lift member 6 and second hinge shaft insertion holes 53, 53 (one only is shown) of a supporting member 5 are aligned and then a second hinge shaft 12 is inserted into the second hinge shaft insertion holes 63, 63 and the second hinge shaft insertion holes 53, 53, that the lift member 6 is rotatably coupled to the supporting member 5 about the second hinge shaft 12 being an axis. It is noted that the pressurized member 14 shown in the drawings have a pin or shaft-like shape, but the one of different shape or the one projecting integrally with or separately from the tip side of the lift member 6 may be used. The pressurized member 14 also includes these.

Furthermore, the following are provided according to the invention: a first fire spread preventing cover C1, wherein its one end portion is attached to the lift member 6 on the front side of a document cover closer 1A and its other end portion attached to the other end portion of the supporting member 5 to cover front surface sides of the second hinge shaft 12, the actuating member 14 and the supporting member 5 and a second fire spread preventing cover C2 attached to the cam slider 32 to cover the pressurized member 13.

The first fire spread preventing cover C1 comprises on its one end side a pair of locking pieces C1a, C1a engaged with a pair of locking holes 51a, 51a provided at a predetermined interval on a tip side of a top plate 51 of a supporting member 5; then, as shown in FIG. 12 to FIG. 15, its curved portion C1b covers and wraps around the outside of the actuating member 14; the first fire spread preventing cover C1 is thus fixed to the supporting member 5 by screwing attaching screws 52b, 52b into attaching holes C1d, C1d covering a front surface side of the supporting member 5 to extend toward a rear portion side of the supporting member 5 and provided on attaching pieces C1c, C1c provided by folding back on its other end side, wherein the attaching screws 52b, 52b have passed through attaching holes 52a, 52a provided on both side plates 52, 52 of the supporting member 5. Furthermore, a concave portion C1e is provided on the first fire spread preventing cover C1 in its area in contact with the curved portion C1b covering a second hinge shaft 12 and the actuating member 14, as well as with a cam slider 32.

A second fire spread preventing cover C2 is composed of a plate-like attaching portion C2a and of a cover portion C2b curved from the attaching portion C2a; attaching holes C2c, C2c provided on the attaching portion C2a are fixedly attached by attaching screws C2e, C2e to attaching holes 32d, 32d provided on a lower surface side of the cam slider 32; as shown in FIG. 12 to FIG. 15, the cover portion C2b wraps around a lower surface of a pressurized member 13 to cover up through its rear side. Furthermore, projecting pieces C2d, C2d are provided on both sides of the cover portion C2a.

Therefore, even in case of an ignition at the periphery of a document cover closer 1A attached to office equipment, a flare produced at that time is blocked by a first fire spread preventing cover C1 and a second fire spread preventing cover C2 to be able to prevent an exposure of internal features to the flare. Still further, even if an end of a document placed on a document platen 2C is in contact with a front side of the document cover closer 1A, this area in contact is covered with the first fire spread preventing cover C1 and the second fire spread preventing cover C2 to eliminate a fear of contamination by an area coated with lubricant oil applied on it. Still further, the first fire spread preventing cover C1 and the second fire spread preventing cover C2 prevent dust and floating matters in the air from entering into the document cover closer 1A, which is thus free from a fear of damaging functions of the document cover closer due to the floating matters.

Figure 9A:
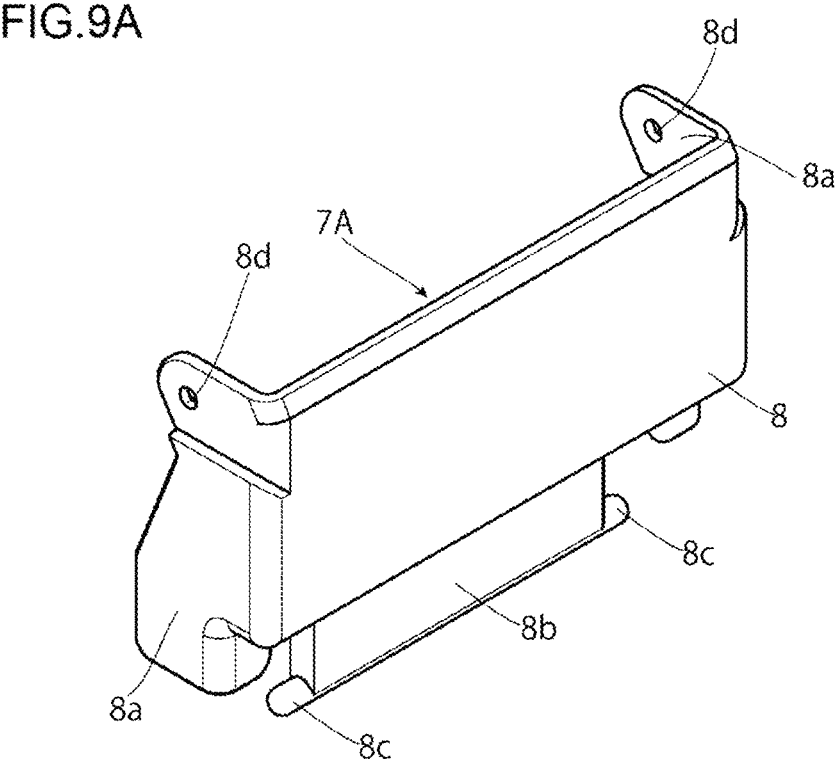
FIGS. 9A and 9B show a finger pinching preventing cover of a document cover closer according to the invention, FIG. 9A being a perspective view, and FIG. 9B—a perspective view on the opposite side.
Figure 9B:
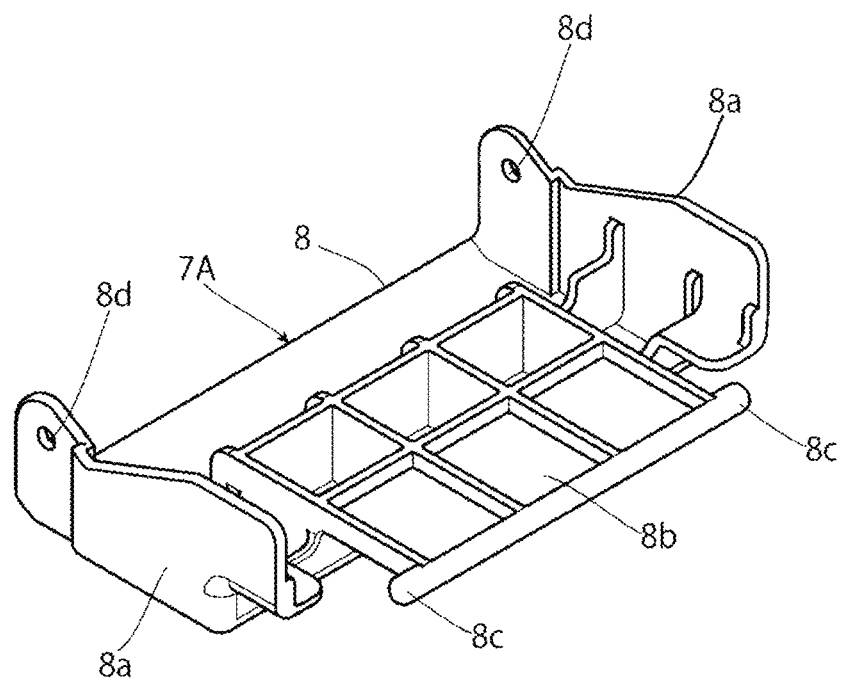
Figure 11:
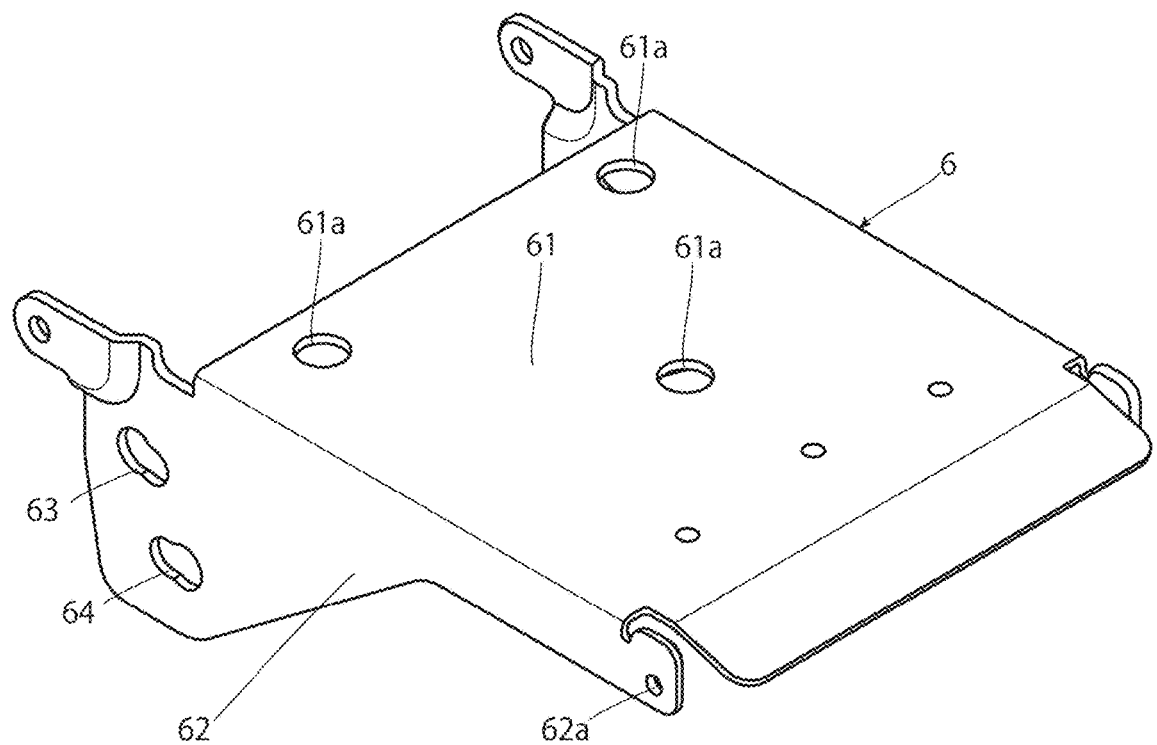
FIG. 11 shows a perspective view of a lift member of a document cover closer according to the invention.
Figure 12:
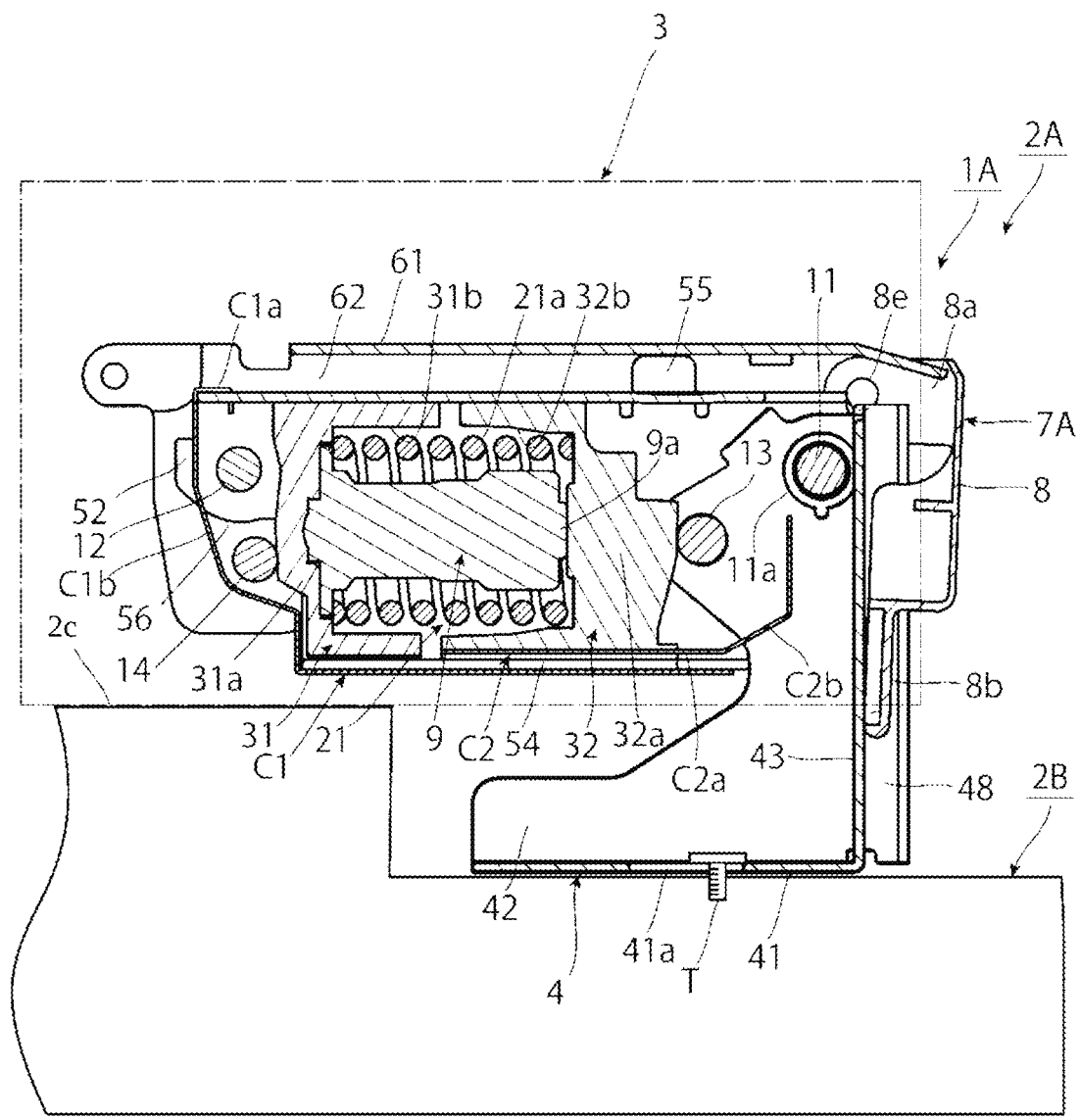
FIG. 12 shows a vertical cross section illustrating an internal structure of a document cover closer according to the invention in a closed state.
Figure 13:
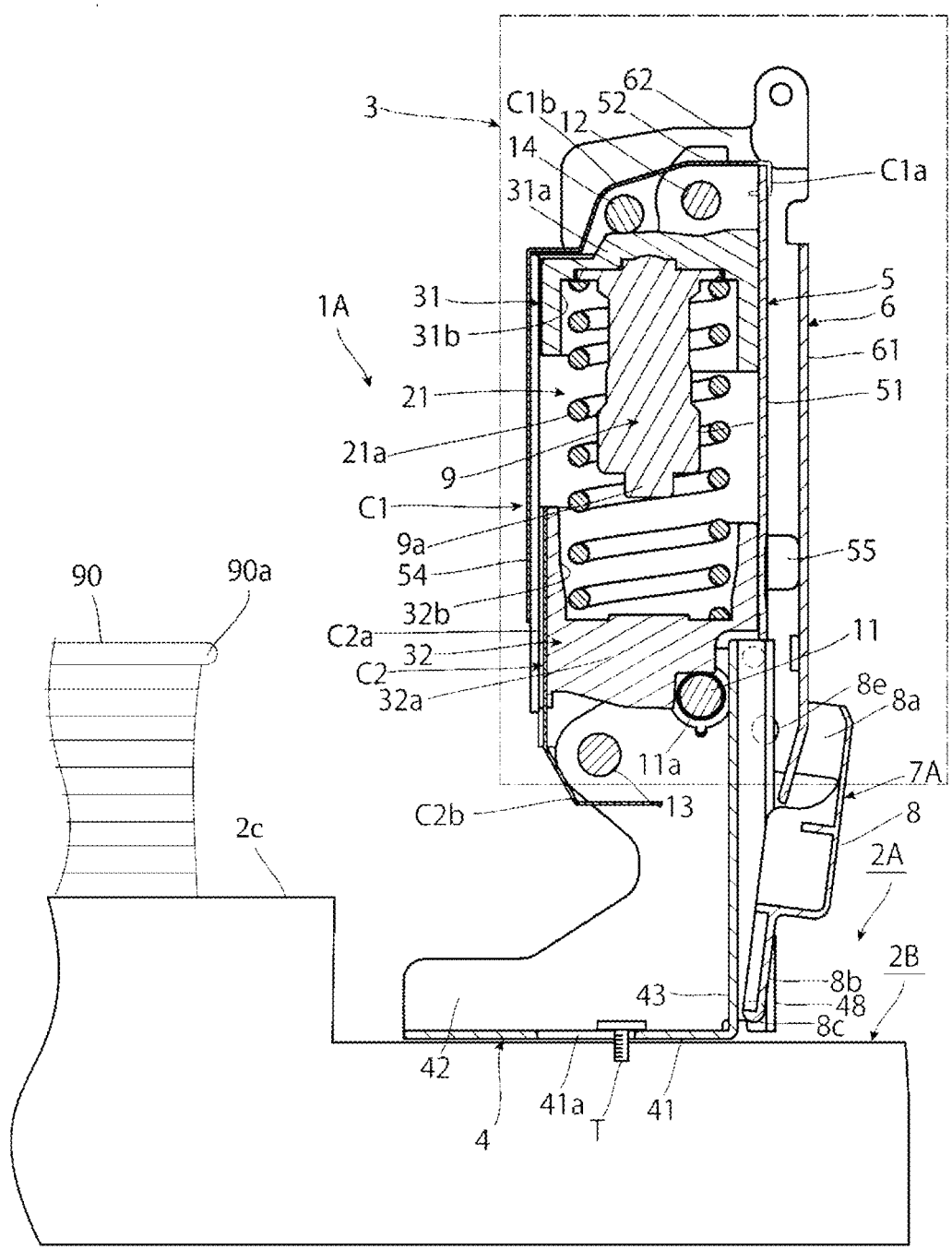
FIG. 13 shows a vertical cross section illustrating an internal structure of a document cover closer according to the invention as opened 90 degrees.

Still further, a finger pinching preventing cover 7A is provided between a rear end side of a supporting member 5 and a rear end side of a lift member 6. As shown in FIG. 9A and FIG. 9B, the finger pinching preventing cover 7A has a horizontal width equal to that of the lift member 6, and a vertical width to fill a gap between the supporting member 5 and the lift member 6, when the lift member 6 is reversed relative to the supporting member 5. The finger pinching preventing cover 7A is composed of a base plate portion 8, both side plates 8a, 8a provided on both sides of the base plate portion 8, and engagement projections 8c, 8c provided to project on both side end portions on a lower end side of an engagement plate portion 8b structured in a narrow width by folding the base plate portion 8 slightly inward. Then, as shown in FIG. 11, attaching holes 62a, 62a (one only is shown) are provided on a right side end portion of both side plates 62, 62 of the lift member 6, and the finger pinching preventing cover 7A is rotatably coupled to the attaching holes 62a, 62a by pivotally supporting pins 8e, 8e passing through attaching holes 8d, 8d provided on upper end portions of the both side plates 8a, 8a of the finger pinching preventing cover 7A. Furthermore, engagement projections 8c, 8c provided on a lower end side of the finger pinching preventing cover 7A are engaged with rail portions 48, 48 provided on an attaching member 4 side.

Moreover, a document cover closer 1A of this embodiment can ensure that a finger pinching preventing cover 7A prevents a user from placing his finger(s) into a gap R (see FIG. 15) between respective rear portions of the supporting member 5 and the lift member 6 to have them pinched.

Still further, a document cover closer 1A of this embodiment ensures that a lower surface of a top plate 61 of a lift member 6 abuts against stopper pieces 55, 55 of a supporting member 5 and that a top plate 51 of the supporting member 5 is substantially in parallel to the top plate 61 of the lift member 6, so that a rear end portion of the lift member 6 is not rotated downward. In this manner, when a document cover 3 is lifted to place a document on a surface of a contact glass 2c on an upper surface of a main body 2B, the document cover 3 is normally lifted upward with holding a grasping portion provided on an end portion opposite to a point at which the lift member 6 of the document cover 3 is attached; thus the document cover 3 is rotated about a first hinge shaft 11 being an axis to expose the surface of the contact glass 2c toward the outside. A document is placed on the surface exposed in this manner of the contact glass 2c.

When a document cover 3 once lifted is lowered after placing a document, the document cover 3 is rotated about a first hinge shaft 11 being an axis in a direction in which the document cover 3 is in contact with the surface of the contact glass 2c (shifted downward). Here, a document cover 3 is rotated, while a top plate 61 of a lift member 6 keeps abutting against stopper pieces 55, 55 of a supporting member 5, and in other words, the document cover 3 keeps avoiding a rotation of the document cover 3 (a lift member 6) about a second hinge shaft 12 being an axis.

Here, if a document (not shown) placed on the surface of the contact glass 2c is thin like paper, a document cover 3 is in surface contact when it is in contact with paper. As a result, an entire document is in pressurizing contact with the document cover 3 and the document is pressed against the surface of the contact glass 2c, so that the document is stably in close contact with the surface of the contact glass 2c.

Figure 14:
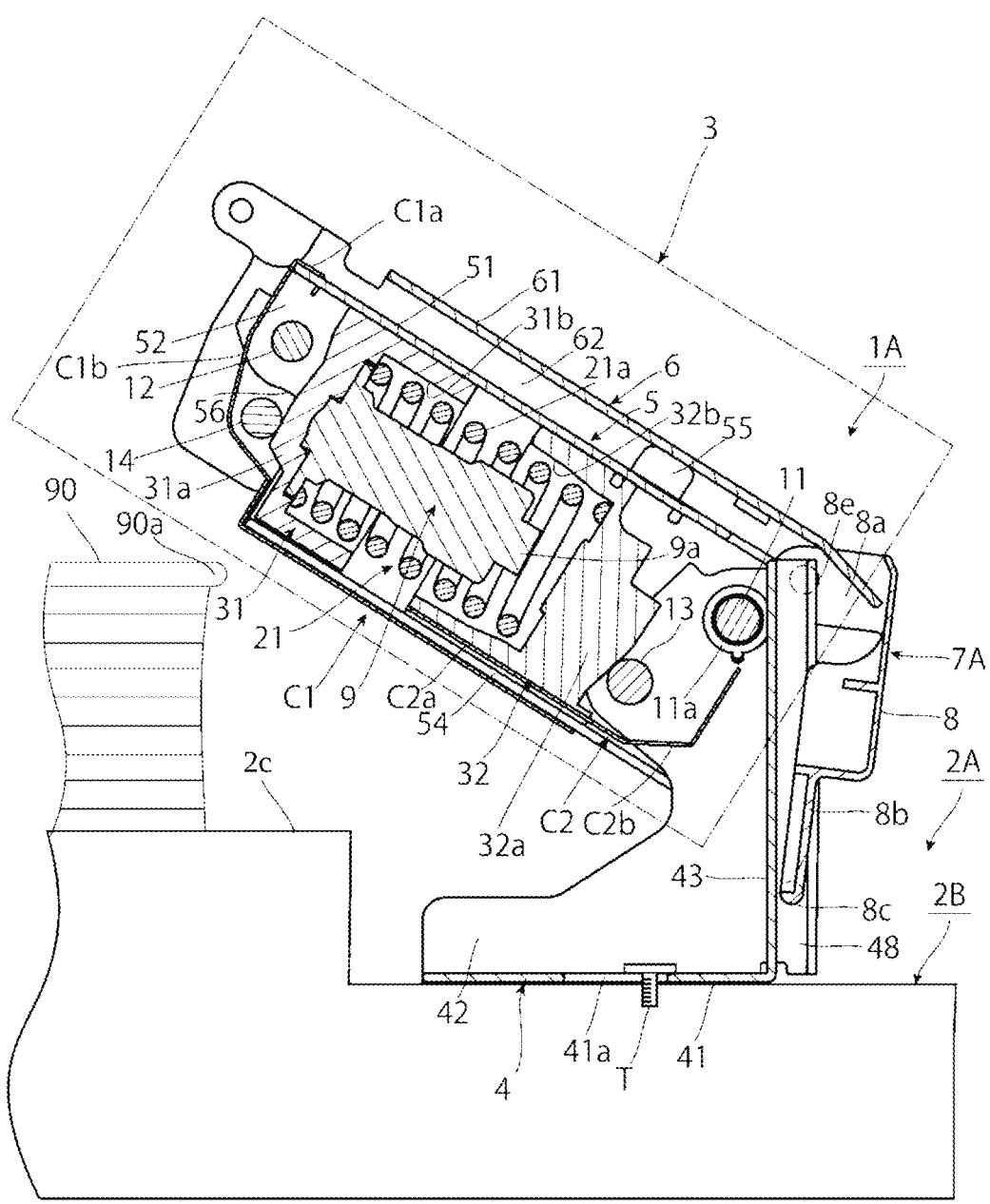
FIG. 14 shows a vertical cross section illustrating an internal structure of a document cover closer according to the invention as opened to an intermediate opening angle.
Figure 15:
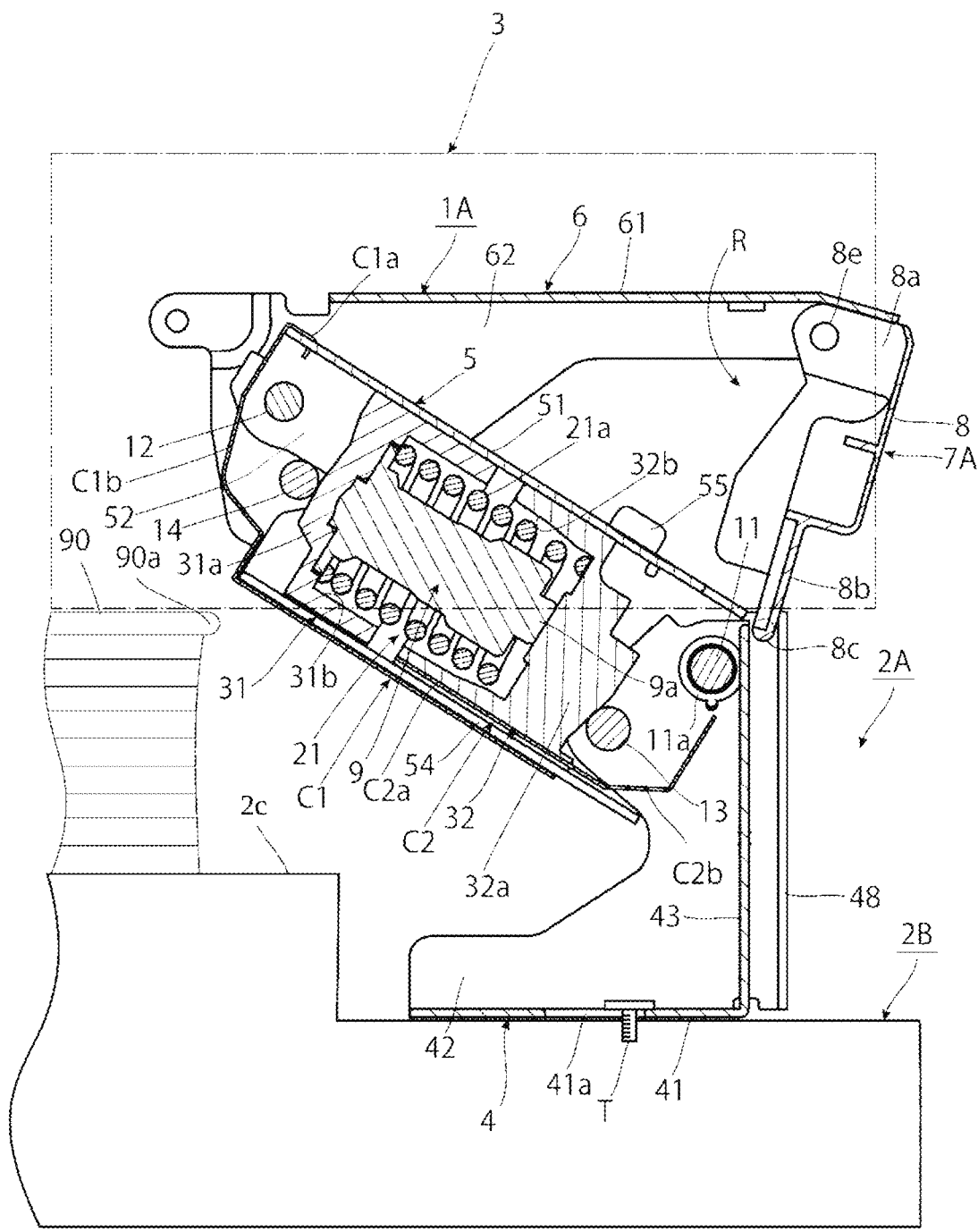
FIG. 15 shows a vertical cross section illustrating an internal structure of a document cover closer according to the invention as it is opened and a lift member is lifted.

On the other hand, if a document 90 placed on the contact glass 2c is thick like a book, when a document cover 3 is closed as shown in FIG. 14 and FIG. 15, a part of a supporting member 5 of the document cover 3 is in contact with an end portion 90a of the document 90 on a supporting member 5 side or its vicinity, and a gap R is formed by an inverse rotation of a lift member 6 between a rear end portion of the document 90 and a rear end portion of the lift member 6. In other words, when a part in vicinity of an end portion on the grasping portion side is pressed against the document platen 2C side, an actuating member 14 presses an actuating slider 31 to a cam slider 32 side to ensure that the actuating slider 31 shifts toward the cam slider 32 side against an urging force of an elastic member 21, and the document cover 3 (the lift member 6) is rotated about a second hinge shaft 12 being an axis. In other words, the document cover 3 is rotated inversely to cover an upper portion of the document 90. For example, if the upper portion of the document 90 is a flat surface, the document cover 3 is in contact with the upper portion. Accordingly, the document 90 thick like a book is stably in close contact with the surface of the contact glass of the document platen 2C. Furthermore, when a lift member 6 is rotated inversely about the second hinge shaft 12 being an axis, a gap R is created between a rear portion of the lift member 6 and a rear portion of the supporting member 5, and there is a risk of finger(s) entering into the gap R without a finger pinching preventing cover 7A; but in the present invention, the gap R is shielded by the finger pinching preventing cover 7A which can prevent finger(s), etc. from entering into the gap R and being pinched by it.

Still further, a finger pinching preventing cover 7A according to the invention has its upper end portion side coupled to a lift member 6 by pivotally supporting pins 8e, 8e, and its lower end portion side engaged with rail portions 48, 48 provided on an attaching member 4 by engagement projections 8c, 8c, so that it is configured to make it impossible to artificially remove the finger pinching preventing cover 7A from a copying machine 2A after a document cover closer 1A is attached to the copying machine 2A; in this manner, the safety is further enhanced.

As described in detail in the foregoing, a document cover closer 1A can ensure that a first fire spread preventing cover and a second fire spread preventing cover successfully prevents influences accompanied by an ignition at peripheral electrical equipment, and more perfectly prevents contamination of a document from lubricant oil than in conventional document cover closers. Still further, it is suitable in use as a document cover closer of office equipment such as a copying machine in particular, allowing a user to use it without a fear of pinching his own finger(s) by finger pinching preventing cover, and also as office equipment using a document cover closer.

What is claimed is:

1. A document cover closer comprising an attaching member attached to a main body side of office equipment having a document cover; a supporting member rotatably and pivotally supported on said attaching member via a first hinge shaft; a lift member attached to said document cover, wherein said lift member overlaps said supporting member and is pivotally supported on said supporting member via a second hinge shaft to be rotatable in a direction contrary to that of said supporting member, a cam slider provided in contact with a pressurized member attached to said attaching member as well as an actuating slider provided in contact with an actuating member provided on said lift member, and an elastic member resiliently provided between said cam slider and said actuating slider, wherein there are provided: a first fire spread preventing cover, wherein one end portion thereof is attached to said supporting member and the other end portion thereof attached to the other end portion of said supporting member to cover a front surface sides of said second hinge shaft, said actuating member and said supporting member, and a second fire spread preventing cover attached to said cam slider to wrap around and thus cover said pressurized member.

2. The document cover closer according to claim 1, wherein locking pieces provided on one end portion side of said first fire spread preventing cover are inserted into locking holes provided on a back plate of said supporting member and locked therein, while the other end portion side thereof is fixed to both side plates of said supporting member.

3. The document cover closer according to claim 1, wherein one end portion side of said second fire spread preventing cover is fixed to said cam slider, while the other end portion side thereof is bent and configured to have a length enough to ensure that said second fire spread preventing cover can cover said pressurized member even when a document cover attached to said lift member is opened.

4. The document cover closer according to claim 1, wherein a concave portion to which said second fire spread preventing cover is attached is provided on said cam slider.

5. The document cover closer according to claim 1, wherein a concave portion for setting free a part of said second fire spread preventing cover is provided on said first fire spread preventing cover.

6. Office equipment using comprising the document cover closer according to claim 1.

* * * * *